US005657378A

United States Patent [19]
Haddock et al.

[11] Patent Number: 5,657,378
[45] Date of Patent: Aug. 12, 1997

[54] DIGITAL SCREEN PHONE TERMINAL WITH GRAPHICAL USER INTERFACE

[75] Inventors: Robert L. Haddock, New York, N.Y.; Joseph P. Randolph, Winchester, Mass.

[73] Assignee: M Power Corporation, New York, N.Y.

[21] Appl. No.: 420,208

[22] Filed: Apr. 11, 1995

[51] Int. Cl.$^6$ .................................................. H04M 11/00
[52] U.S. Cl. .................................. 379/93.23; 379/93.24; 379/93.08; 379/93.28
[58] Field of Search ......................... 379/96, 97, 98, 379/94, 93, 100

[56] References Cited

U.S. PATENT DOCUMENTS

| Re. 30,773 | 10/1981 | Glaser et al. | 235/379 |
|---|---|---|---|
| 4,392,023 | 7/1983 | Sears | 179/2 DP |
| 5,036,513 | 7/1991 | Greenblatt | 379/96 |
| 5,195,130 | 3/1993 | Weiss et al. | 379/98 |

FOREIGN PATENT DOCUMENTS

| 0365200 | 4/1990 | European Pat. Off. . |
|---|---|---|
| 0526729 | 2/1993 | European Pat. Off. . |
| 0630141 | 12/1994 | European Pat. Off. . |
| 2156186 | 10/1985 | United Kingdom . |
| 2285897 | 7/1995 | United Kingdom . |
| WO91/07839 | 5/1993 | WIPO . |

OTHER PUBLICATIONS

Bank Technology News, "Citibank Screenphone Spawns Competition", Jul. 1994, two pages.
CardTech/SecurTech '94 "Building Foundations for Innovation", Apr. 11–13, 1994, two pages.
Citibank, Philips screen telephone advertisement, 1994, one page.
Philips screen telephone advertisement, one page.
Philips P100 Enhanced Telephone Flat Screen Text Telephone advertisement, one page.
VeriFone Omni VuFone advertisement, 1994, one page.
Forval FP–500 and FP–500MR Super Display Phones advertisement, 1994, one page.
Forval FP–500 Super Display Phone advertisement, one page.
Consumer Information Appliance, "Screen Phone" article, Sep. 1994, one page.
Washington Technology, "In The Netplex: New World Order?" article, Sep. 29, 1994, 1 p.
U.S. Order Phoneplus advertisement, one page.
International Searching Authority/European Patent Office, International Search Report, Sep. 13, 1996, application No. PCT/US96/0496, seven pages.
IEEE International Conference on Communications, vol. 2/3, Mahy 23–26, 1993, "Dual Media Messaging Using Screen Telephones on the Telephone Network", Barry K. Schwartz and Stephen B Weinstein, pp. 1183–1188.
IEEE Communications Magazine, No. 4, Apr. 28, 1990, "Screen–Based Telephony", Bob McNinch, pp. 34–38.

*Primary Examiner*—Stella Woo
*Attorney, Agent, or Firm*—Testa, Hurwitz & Thibeault, LLP

[57] ABSTRACT

A telephone device for accessing electronic services includes a housing having a front portion with a display device and a telephone keypad. The telephone device provides a graphical user interface whereby user selectable options are presented in a graphical format on the display device and a user is allowed to make selections therefrom with, for example, a point-and-click mechanism. A processor, preferably a single programmable digital signal processor, is responsive to the telephone keypad and the user selectable options and executes a variety of modem functions, telephone functions, and application programs. The programmable digital signal processor also supports the graphical user interface.

18 Claims, 10 Drawing Sheets

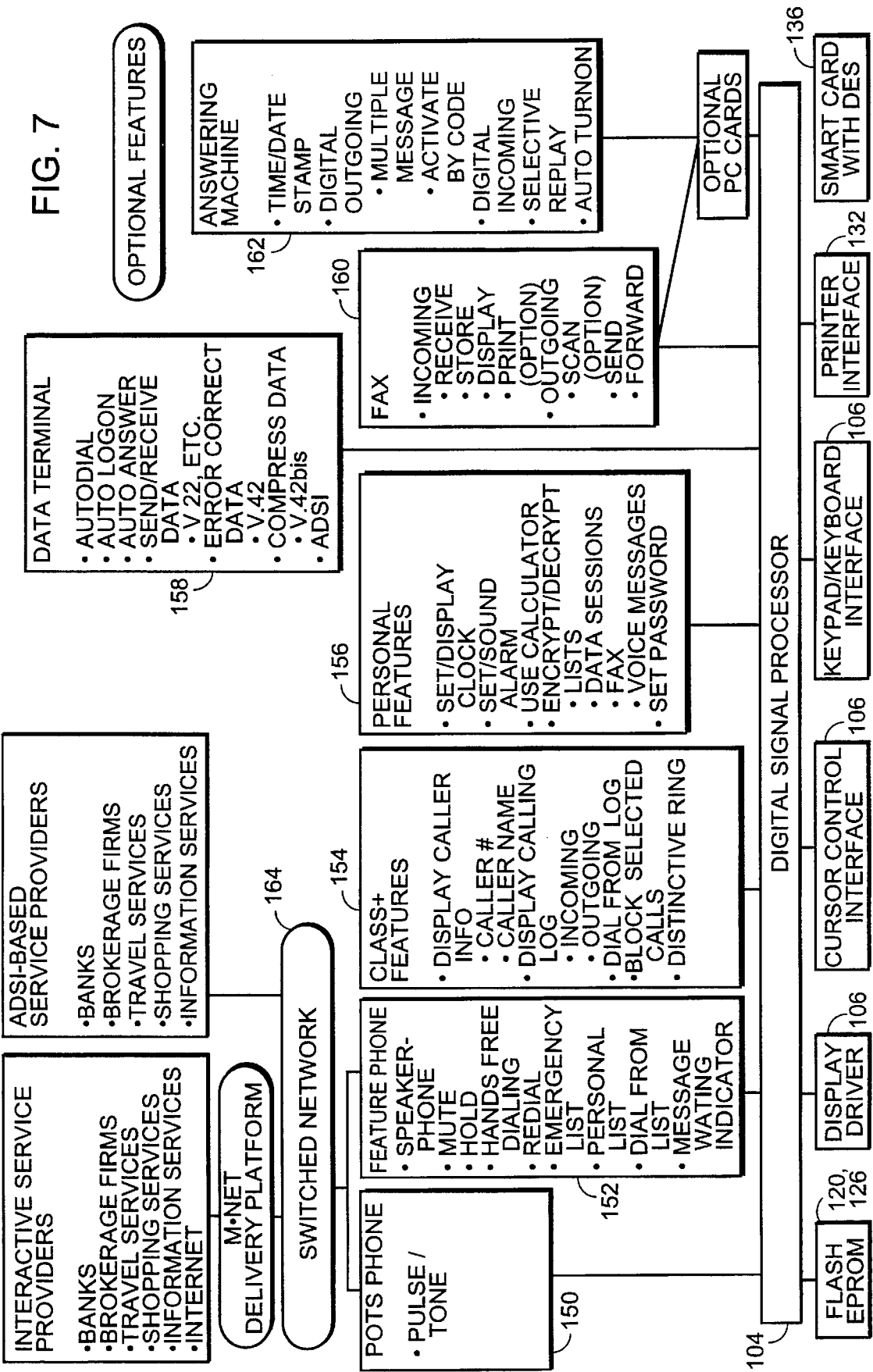

DIGITAL SCREEN PHONE TERMINAL WITH GRAPHICAL USER INTERFACE

FIELD OF THE INVENTION

This invention relates to communication devices and, more particularly, to powerful, low cost, user friendly telephone terminals which have display screens and which utilize digital signal processing and graphical user interface technologies to provide modem and telephone functions.

BACKGROUND OF THE INVENTION

A telephone having a display screen, a telephone keypad, and a telephone handset is known, and it sometimes is referred to as a "screen phone". Companies such as Philips, VeriFone, Forval, U.S. Order, and SmartPhone Communications each provide such a telephone. These screen phones generally look like conventional telephones except they have the display screen which typically is located above the keypad. Some screen phones have an alphanumeric keyboard.

Known screen phones typically utilize a hardware architecture having three physically separate and discrete hardware modules: a general purpose microprocessor (and associated memory and logic) for executing application programs and/or controlling the other modules; a modem; and telephone electronics. Known screen phones typically use the keypad keys and/or dedicated function key buttons on the face of the phones to control the phones and select options presented on the display screen. Some known screen phones which use the ADSI protocol developed by Bellcore provide programmable "softkeys" on the display screen. The softkeys allow the fixed-position function key buttons to be programmably assigned a meaning.

SUMMARY OF THE INVENTION

The invention relates to a telephone device which includes a housing having a front portion with a display device and a telephone keypad. A telephone handset is external to the housing but connected thereto by, for example, a conventional telephone cord. In accordance with the invention, the telephone device provides a graphical user interface whereby user selectable options are presented in a graphical format On the display device and a user is allowed to make selections therefrom with, for example, a point-and-click mechanism. The user accesses various electronic services by, for example, pressing the telephone keypad keys and/or selecting options via the graphical user interface. A processor, preferably a single programmable digital signal processor, is responsive to the telephone keypad and the user selectable options and provides a variety of modem and telephone functions which allow the telephone device to communicate with the various electronic services. The programmable digital signal processor also preferably supports the graphical user interface and also executes a variety of built-in functions and application programs. With this telephone device, a user thus can electronically perform a variety of tasks such as, for example, banking transactions, purchases, information retrieval, and information dissemination.

The modem functions performed by the programmable digital signal processor of the telephone device according to the invention can include modulation/demodulation, compression/decompression, and error correction of voice and data signals including facsimile images. The telephone functions include speech path processing as well as other telephone functions such as auto-dialing, call progress monitoring, DTMF (dual-tone multi-frequency) processing, call status, call waiting status, call duration, incoming/outgoing calling logs, and caller ID. The built-in functions can include, for example, clock, alarm, calendar, organizer, calculator, phone lists. The application programs can include, for example, terminal emulation, home banking, airline reservations, etc.

The telephone device according to the invention is thus in effect a remote input/output device which provides the user with access to a variety of electronic services. Also, when not being used as a remote input/output device for accessing electronic services, the telephone device provides a complete set of feature telephone functions.

The telephone device can send and receive voice and data signals over a variety of communication media including analog telephone lines, digital lines (e.g., ISDN or Integrated Services Digital Network), wireless networks such as cellular networks, and communications networks in general. The data signals can include facsimile images.

In a preferred embodiment of the telephone device, an alphanumeric keyboard is provided. The keyboard preferably is a 55-key QWERTY keyboard and is slidable into and out of the housing for easy and convenient storage and access. The keyboard provides the user of the device with a convenient way to enter alphanumeric information.

The use of a graphical user interface makes the telephone device according to the invention extremely simple to operate and very user-friendly. The programmable digital signal processor alone executes the modem functions, telephone functions, and application programs, unlike known screen phones which typically use physically separate and discrete hardware modules for these functions. In addition to implementing the graphical user interface and providing the modem, telephone, and application functions, the programmable digital signal processor also preferably provides other built-in functions (e.g., clock, alarm, calendar, organizer, calculator, phone lists, etc.). In general, all of the functionality of the telephone device is alterable by reprogramming the telephone device.

By using a single hardware element (i.e., the programmable digital signal processor) to perform operations previously performed by three or more physically separate, discrete hardware modules, the telephone device according to the invention can be produced for a lower cost as compared to known screen phones which use a plurality of separate hardware modules. Also, a very powerful programmable digital signal processor can be purchased for a fraction of the cost of a general purpose microprocessor having comparable compute power. Because one or more of the physically separate, discrete hardware modules of a known screen phone typically includes a general purpose microprocessor, the price difference between a programmable digital signal processor and a comparably powerful general purpose microprocessor translates into a significant manufacturing cost savings in favor of the telephone device of the invention. Cost is, however, only one of the advantages of this telephone device over known screen phones.

The telephone device according to the invention can be quickly and easily upgraded or modified by downloading new software for use by the programmable digital signal processor. In a preferred embodiment of the invention, the software is downloaded into one or more memory modules associated with the programmable digital signal processor, and the programmable digital signal processor accesses the memory module(s) in order to execute its various functions.

Known screen phones typically require an entire hardware module to be removed and replaced in order to modify that aspect of the screen phone. For example, to upgrade the modem module of a known screen phone from 2400 bits per second (bps) to 9600 bps, it typically is necessary to remove the entire 2400 bps hardware module and replace it with a new 9600 bps hardware module. The telephone device of the invention can be upgraded with significantly less effort, time, and cost. Also, in about the same time it takes to perform one software download operation, more than one (or all) aspects of the telephone device's functionality (e.g., modem, telephone, application programs, and built-in functions) can be altered. In contrast, altering more than one hardware module of a known screen phone increases the required effort, time, and cost significantly over that required to alter a single hardware module.

The telephone device according to the invention also is more reliable than known screen phones. The higher reliability is due in part to the integrated design which uses a single programmable digital signal processor to perform a variety of operations such as the execution of modem functions, telephone functions, application programs, and built-in functions. This centralized, integrated design of the telephone device eliminates the need for any sort of high level controlling microprocessor which known screen phones typically use to help the plurality of separate, discrete hardware modules thereof operate together without conflict.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIGS. 3A, 3B, and 3C are examples of graphical displays shown to a user of the digital screen phone terminal on the display screen thereof.

FIG. 7 is a diagram showing some of the functionality of the digital screen phone terminal according to the invention.

DESCRIPTION

Figure 1A:
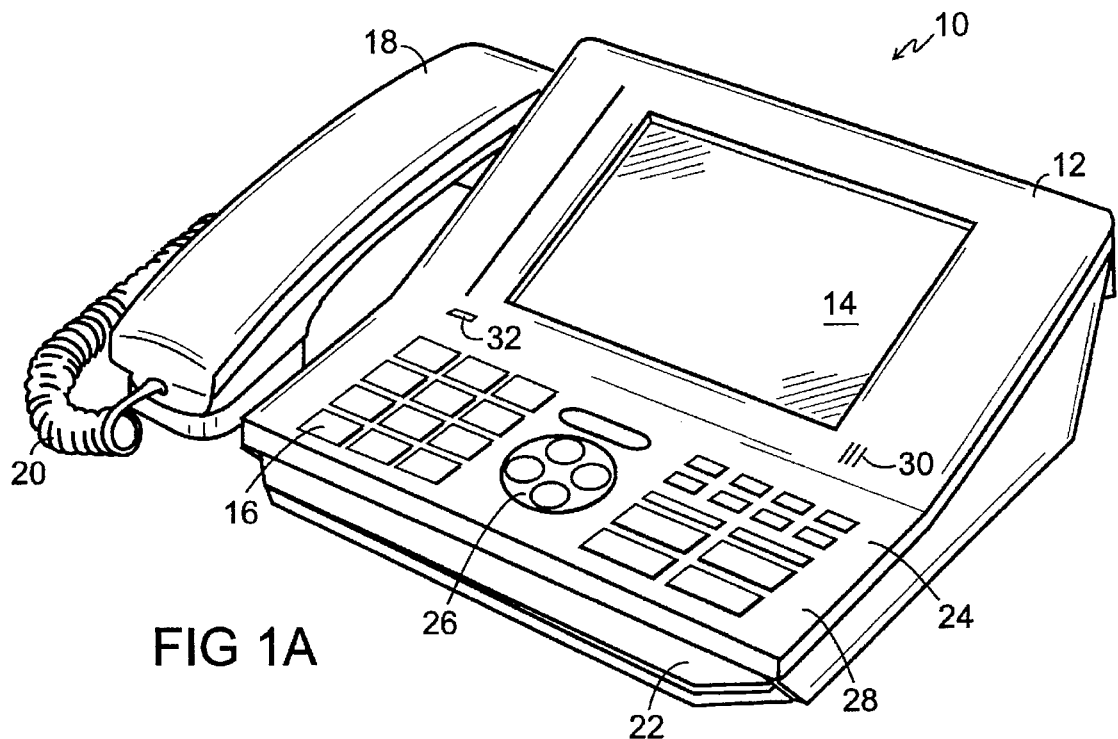
FIG. 1A is a perspective view of a digital screen phone terminal according to the invention, with an alphanumeric keyboard in its stowed position.
Figure 1B:
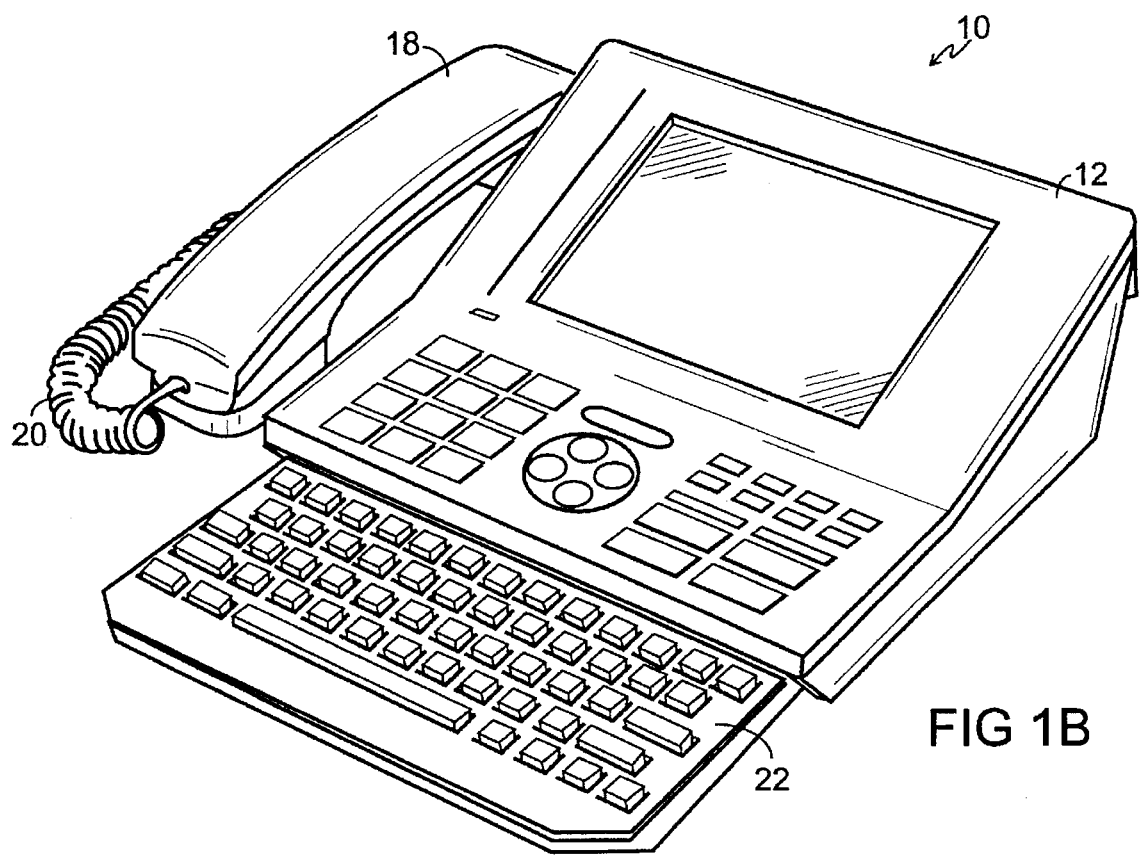
FIG. 1B is a perspective view of the digital screen phone terminal showing the alphanumeric keyboard slid out for allowing access thereto.

Referring to FIGS. 1A and 1B, a telephone device according to the invention is a digital screen phone terminal 10 with a housing 12 and a telephone handset 18. The handset 18 is separate from or external to the housing 12, and it is connected to the housing 12 by a telephone handset cord 20. The front portion of the housing 12 of the terminal 10 has a display screen 14 and a point-and-click mechanism 26. The terminal 10 provides a user thereof with a graphical user interface which includes user selectable options displayed in a graphical format on the display screen 14. The user can select among the options displayed in the graphical format by manipulating the point-and-click mechanism 26. The front portion of the housing 12 also has a telephone keypad 16, function keys 24, telephone operation keys 28, a microphone 30, and a telephone message indicator lamp 32. The keypad 16 and/or the functions keys 24 can be used with, or in place of, the point-and-click mechanism 26 by a user of the terminal 10 to make option selections. In a preferred embodiment of the terminal 10, an alphanumeric keyboard 22 is provided. The keyboard 22 slides into (FIG. 1A) and out from (FIG. 1B) the housing 12 in order to stow it or allow access to it.

Figure 2:
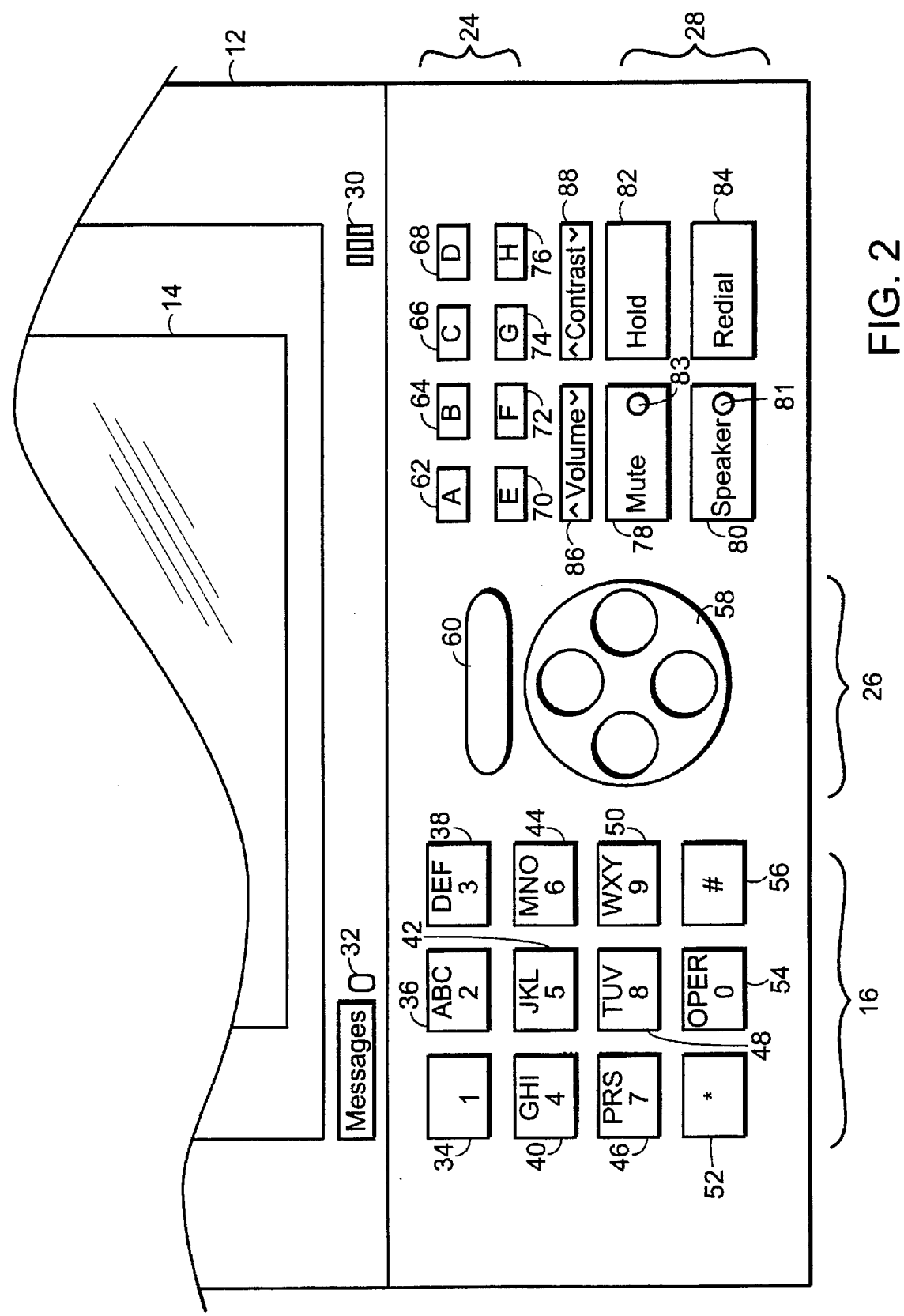
FIG. 2 is a top view of a portion of the front of the digital screen phone terminal of FIGS. 1A and 1B.

Referring to FIG. 2, the keypad 16 on the front portion of the terminal's housing 12 includes twelve user pressable keys 34-56 similar to a conventional telephone keypad. The message indicator lamp 32 lights when one or more messages have been received. The microphone 30 is for receiving the user's voice when the terminal 10 is being operated in speakerphone mode (i.e., without using the handset 18). One of the telephone operation keys 28, labeled "speaker" 80, is used to turn the speakerphone mode on and off. In a preferred embodiment, a light 81 on the speaker key 80 indicates when the speakerphone mode is activated. The terminal 10 includes a speaker (not shown) for projecting sound when the terminal 10 is used in the speakerphone mode. Another one of the telephone operation keys 28, labeled "mute" 78, is for disabling the microphone 30 to allow, for example, the user to speak aloud while in the speakerphone mode without being heard on the other end but still hearing transmissions from the other. The mute key 78 also preferably includes a light 83 for indicating when the mute mode is activated. The other telephone operation keys 28 are a "hold" key 82 and a "redial" key 84 which, respectively, put a caller on hold and automatically redial the last-dialed telephone number. A speaker volume control 86 and a display screen contrast control 88 are provided. In some embodiments, the terminal 10 has eight function keys 62–76, and in some other embodiments, it has four such keys.

Still referring to FIG. 2, in a preferred embodiment, the point-and-click mechanism 26 includes a cursor controller 58 and an activation button 60. Together, the cursor controller 58 and the activation button 60 allow the user to select a desired one of the options displayed in the graphical format on the display screen 14 by moving a cursor to or near that option and then indicating confirmation of the selection. The cursor controller 58 responds to the user's touches by moving the cursor in the corresponding direction: up, down, left, right, or diagonally. The activation button 60 is pressed when the cursor is at or near the desired option.

In some alternative embodiments, the point-and-click mechanism 26 is replaced by another interface mechanism such as, for example, a touch screen mechanism or a voice activated mechanism. The touch screen mechanism would allow the user to select among options displayed in the graphical format on the display screen 14 by touching, or pointing at or near, that option. In this touch screen embodiment, the point-and-click mechanism 26 might be removed from the front of the terminal's housing 12, the display screen 14 would be replaced with a suitable touch screen or touch-detecting elements would be added to the existing display screen 14, and the terminal 10 would be programmed to implement the touch screen feature. The voice activated mechanism would allow the user to select among options displayed in the graphical format on the display screen 14 by uttering an instruction corresponding to that option. In this voice activated embodiment, the point-and-click mechanism 26 might be removed from the front of the terminal's housing 12, the microphone 30 might be used to receive the uttered instructions, and the terminal 10 would be programmed to implement the voice activated feature. In general, whatever the interface mechanism employed to allow the user to make option selections, the terminal 10 will have a graphical user interface for making the task simple, easy to understand, and intuitive in accordance with the invention.

Figure 3B:
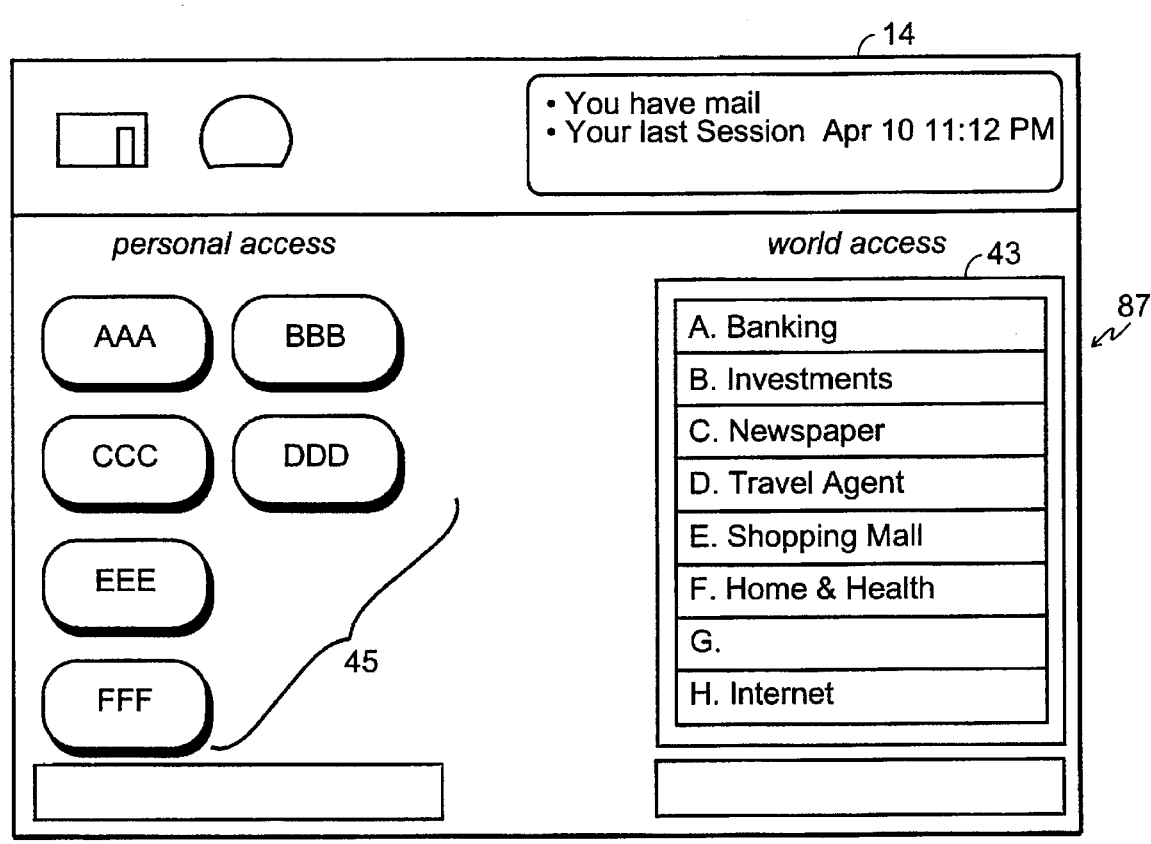
Figure 3B:
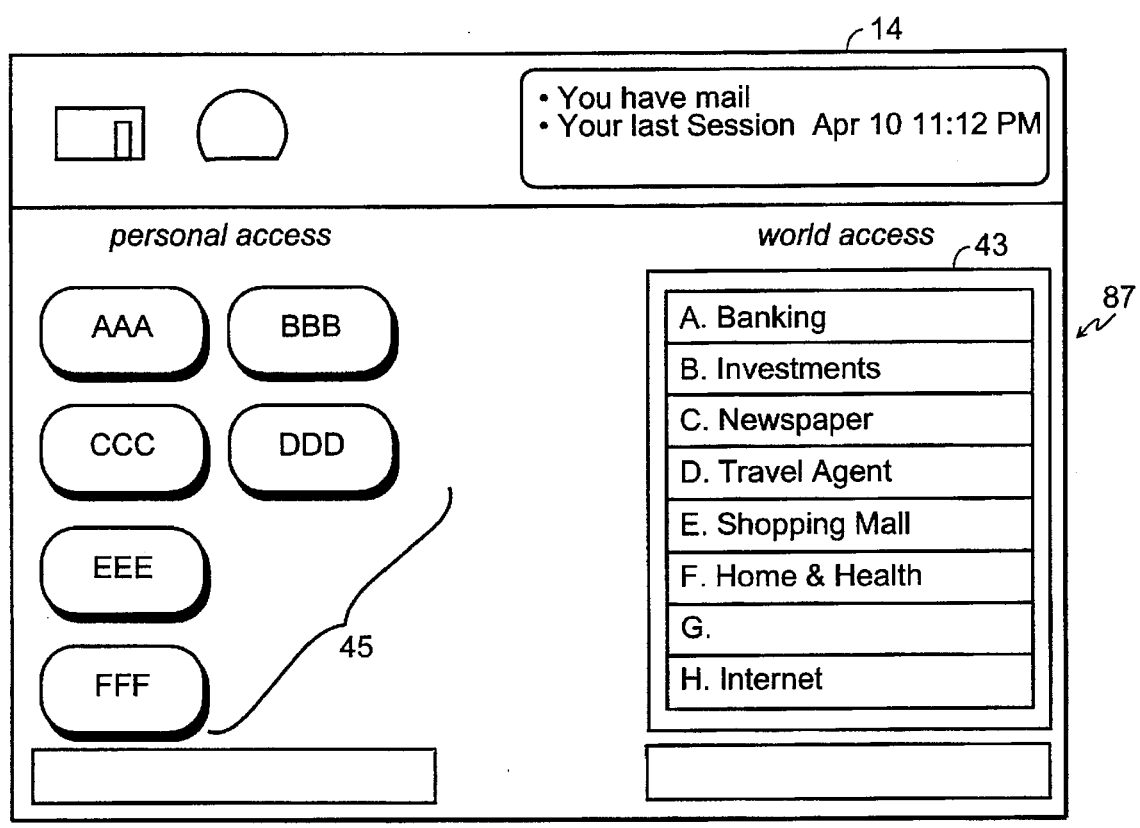
Figure 3C:
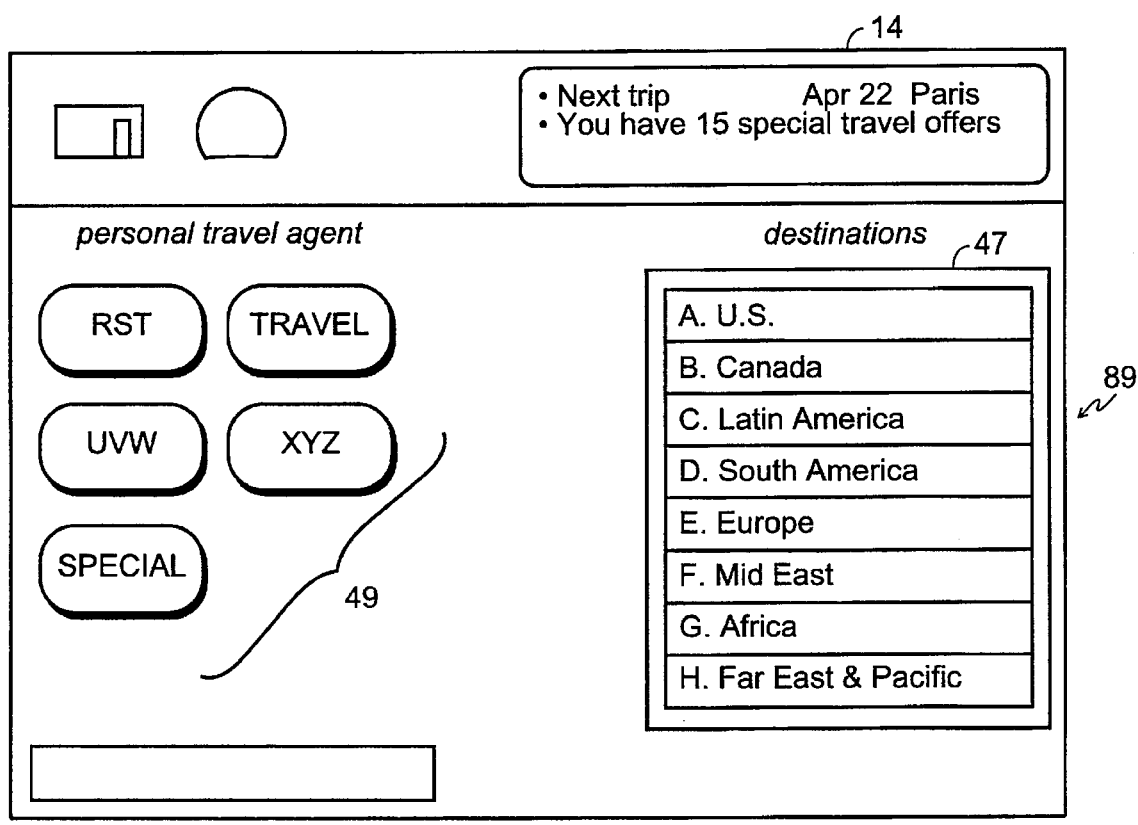

The graphical user interface provides user selectable options in a graphical format on the display screen 14. Referring to FIGS. 3A, 3B, and 3C, examples of such a graphical format are provided by a home page screen 85, a world page screen 87, and a personal travel agent screen 89 which the user might see and interact with when using the digital screen phone terminal 10 of the invention. The user is provided with options via a variety of graphical features including buttons, scrolling lists, radio buttons, check boxes, dialog boxes, etc. The options provided to the user on the sample home page screen 85 can include, for example, buttons for manipulating phone calls 37 and messages 39 and information related thereto. The letters (e.g., ABC) shown within the buttons are representative of indicia that can be displayed to the user to identify the particular function of each button. The user can be provided with access to various stored phone numbers via a directory listing 41. The options provided to the user on the world page screen 87 can include, for example, the ability to access various electronic services and application programs via a directory 43 of such services and applications and a variety of other options accessible via various buttons 45. The options provided to the user on the personal travel agent screen 89 can include, for example, the ability to select various destinations via a destinations directory 47 and other options identified by various buttons 49. The user of the terminal 10 manipulates the point-and-click mechanism 26 in order to point the cursor on the display screen 14 to, for example, the desired button and then select the option identified by that button.

Figure 4:
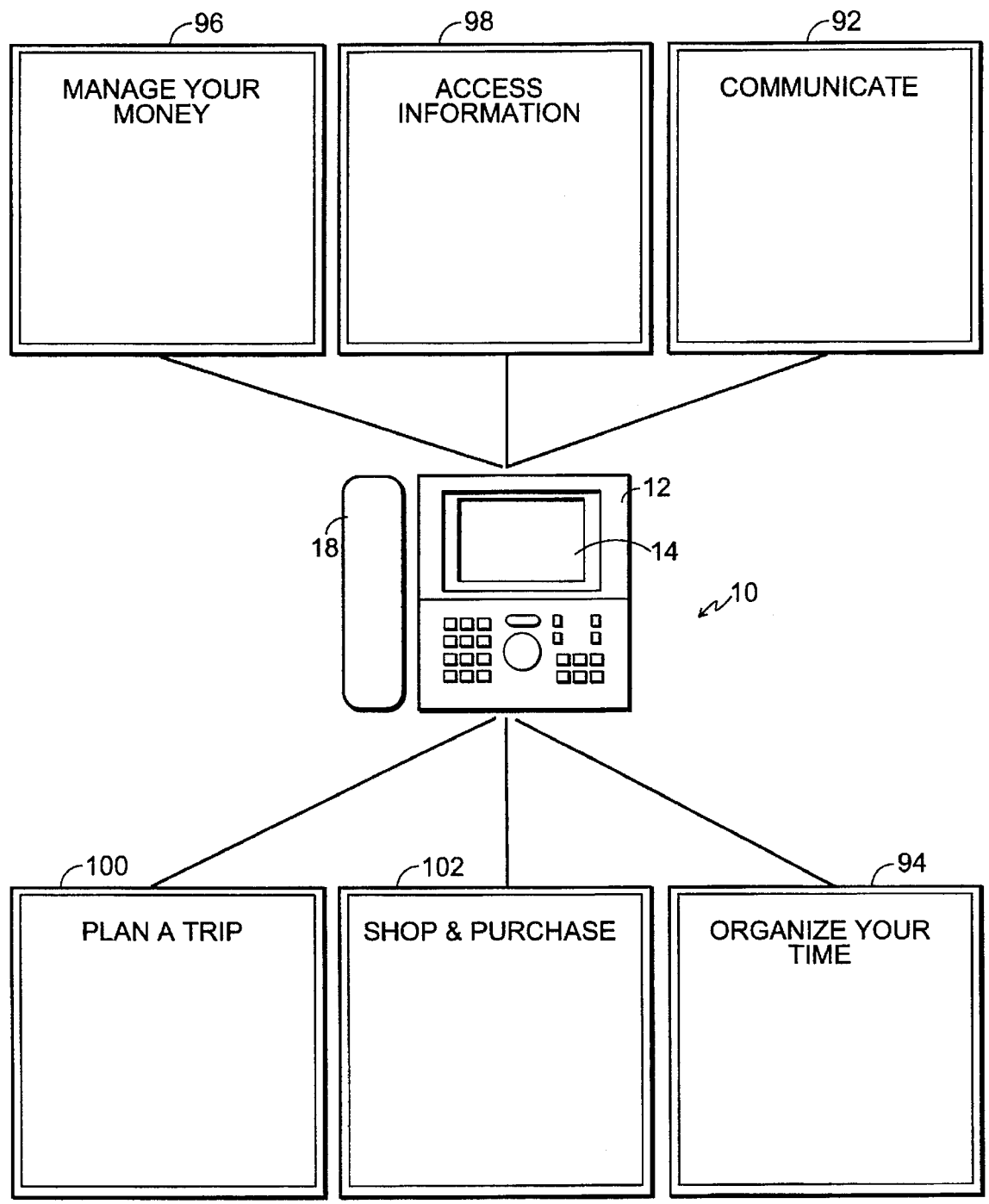
FIG. 4 is a diagram of some of the electronic services which can be accessed with the digital screen phone terminal according to the invention.

Referring to FIG. 4, the digital screen phone terminal 10 provides various built-in organizational tools 94 such as calendar, clock, calculator, organizer, to do list, telephone number list, outgoing and incoming call log, call back list, and alert functions. The tools 94 are functions programmed into the terminal 10 and generally are accessed by a user interacting with the terminal's graphical input/output features (e.g., the display screen 14 and the point-and-click mechanism 26, the keypad 16, and/or the function keys 24). The terminal 10 also provides various built-in communication capabilities 92 including modem and telephone functions which allow the terminal 10 to access various electronic services such as banking services 96, information services 98, travel planning services 100, and consumer services 102. The modem functions provided by the terminal 10 can include modulation and demodulation, decompression and compression, and error correction of outgoing and incoming voice and data signals. The data signals can include representations of facsimile images. The telephone functions provided by the terminal 10 include speech path processing. In general, the terminal 10 also provides at least all of the telephone functions provided by a conventional feature telephone such as auto-dialing, call progress monitoring, DTMF (dual-tone multi-frequency) processing, CLASS+ features including call status, call waiting status, call duration, caller information (e.g., caller ID and name), incoming/outgoing calling logs, dial from log, block selected calls, and distinctive rings.

The banking services 96 can include bill paying, bank account transactions (e.g., transfer of funds between accounts, obtaining account balances, etc.), and financial information retrieval (e.g., bank loan interest rates). The information services 98 can include news on topics such as finance, weather, sports, and entertainment. The travel planning services 100 can include viewing airline schedules, making reservations, ordering tickets, and viewing maps. The consumer services 102 can include retrieval of product information and the ordering of products and services. In general, the terminal 10 can access and interact with any electronic service.

Figure 5A:
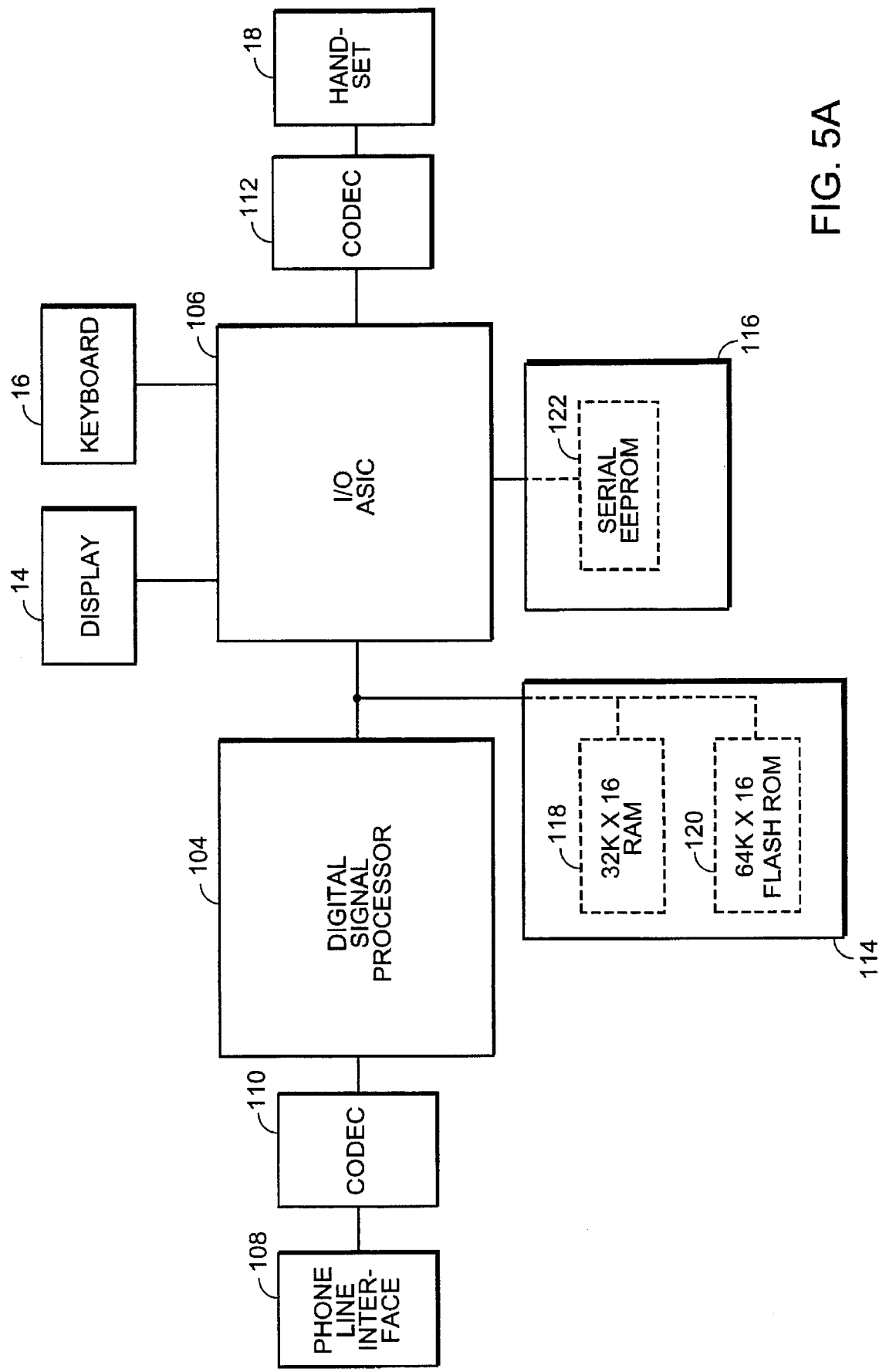
FIG. 5A is a block diagram of the hardware components of a basic version of the digital screen phone terminal.
Figure 5B:
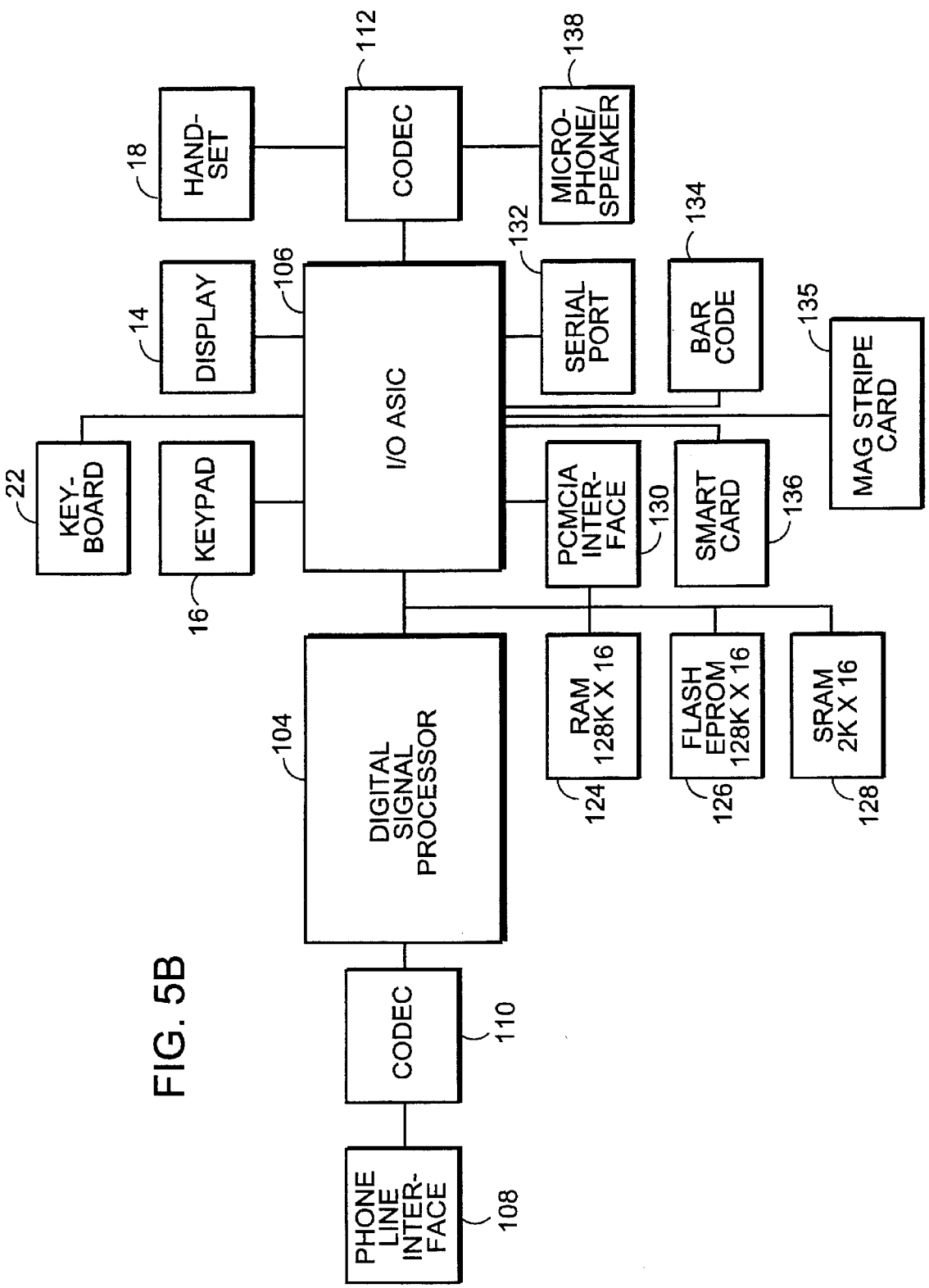
FIG. 5B is a block diagram of the hardware components of an advanced version of the digital screen phone terminal.

The digital screen phone terminal 10 according to the invention can be provided in two versions, a basic version (FIG. 5A) and an advanced version (FIG. 5B).

Referring to FIG. 5A, the basic version of the terminal 10 includes at least the following components within the housing 12: a programmable digital signal processor (DSP) 104; an input/output (I/O) controller 106; an I/O communications interface 108; an interface codec 110; a handset codec 112; and memory 114, 116. This basic version also includes the telephone keypad 16 and the display screen 14 which are both contained within the housing 12 but which are exposed to allow the user to manipulate/view them. The telephone handset 18 is also shown in FIG. 5A.

Referring to FIG. 5B, the advanced version of the terminal 10 includes at least the following components within the housing 12: the programmable DSP 104; the I/O controller 106; the I/O communications interface 108; the two codecs 110, 112; a speakerphone 138; memory 124, 126, 128; and various interfaces 130, 132, 134, 136 for receiving various cards. In addition to the keypad 16, the screen 14, and the handset 18, this advanced version includes the stowable alphanumeric keyboard 22.

Referring to FIGS. 5A and 5B, both the basic version and the advanced version include the programmable DSP 104 and the I/O controller 106. The programmable DSP 104 uses digital signal processing techniques, and it alone implements the modem functions, the telephone functions, and the application programs. The programmable DSP 104 is basically the same element with the same functionality in both the basic version and the advanced version. The programmable DSP 104 is aided by the I/O controller 106 which performs some of the basic, low-level control functions necessary to interface with the various I/O devices including the keypad 16, the display 14, the keyboard 22, the memories 114, 116, 124, 126, 128, and the interfaces 130, 132, 134, 136. The low-level control functions handled by the I/O controller 106 can include, for example, scanning the keypad 16 and/or keyboard 22 for user inputs and updating the display screen 14. The I/O controller 106 is a slave to the programmable DSP 104. The I/O controller 106 used in the advanced version typically is more complex than the I/O controller 106 in the basic version because more I/O devices must be handled in the advanced version.

In a preferred embodiment of the terminal 10 of the invention, the programmable DSP 104 is a single Texas Instruments TMS320C50 series digital signal processor chip with compute power of about 28 MIPS (Millions of Instructions Per Second), and more preferably either a C51 or a C52 chip. It is possible to use other digital signal processors instead of the presently preferred chip(s), but it has been discovered that any such chip should have compute power of about 28 MIPS or greater. Also, in the preferred embodiment, the I/O controller 106 is an ASIC (Application Specific Integrated Circuit) chip custom designed to provide the necessary interface functions including the I/O "glue logic" which is frequently a plurality of separate chips but which here has been included in the ASIC. A prototype of the terminal 10 used a relatively low cost, low power 8-bit microcomputer in place of the ASIC.

In the basic version of the terminal 10, as shown in FIG. 5A, a repertory dialing number memory 116 is provided for storing repertory dialing numbers. In the disclosed embodiment, this memory 116 is a 1K-by-8 serial Electrically Erasable Programmable Read Only Memory (EEPROM) 122. Memory 114 for the programmable DSP 104 includes, in the disclosed embodiment, a 32K-by-16 Random Access Memory (RAM) 118 and a 64K-by-16 Flash Read Only Memory (ROM) 120. The modem function, telephone function, application program, and built-in function software which dictates the operations performed by the programmable DSP 104 generally resides in the memory 114. New software is downloadable into the Flash ROM 120 to incorporate new features and/or modify existing features of the terminal 10. Only about 25% or so of the memory 114 is required for the programmable DSP 104 to perform its modem and telephone functions and for the I/O controller 106 to perform its low-level control functions. This leaves about 75% or so of the memory 114 for the other built-in functions and application programs which the programmable DSP 104 executes and the terminal 10 provides to the user. As mentioned previously, the built-in functions can include clock, alarm, calendar, organizer, calculator, phone list, etc. functions, and the application programs can include terminal emulation such as a VT-100 terminal emulation program as well as a variety of other applications.

Still referring to FIG. 5A, the two codecs 110, 112 and the communications interface 108 are required to interface the programmable DSP 104 and the I/O controller 106 to analog telephone lines and the handset 18 which is analog. One or more of the two codecs 110, 112 and the interface 108 could be replaced or removed if the terminal 10 is to be coupled to a non-analog line such as the ISDN or other non-analog communications network.

In the disclosed embodiment of the advanced version of the terminal 10, as shown in FIG. 5B, the repertory dialing number memory is implemented with a 2K-by-16 SRAM (Static RAM) 128 which is a battery-backed memory chip, and the DSP/controller memory is implemented with a 128K-by-16 RAM 124 and a 128K-by-16 Flash Erasable PROM (EPROM) 126. The interfaces can include a personal computer memory card interface (PCMCIA) 130 for receiving a PCMCIA memory card, a serial port interface 132 for receiving essentially any serial device card (e.g., a card for a printer or computer), a bar code interface 134 for interfacing with any bar code reader via serial communications, a smartcard interface 136 for receiving any smartcard, and a magnetic stripe card interface 135 for receiving a magnetic stripe card. The handset codec 112 in this version is slightly different from the one in the basic version because in this advanced version the handset codec 112 includes multiplexing to accommodate the handset 18 and the speakerphone 138.

Either version of the digital screen phone terminal 10 according to the invention can have an encryption feature which provides secure communications. Three basic functions are required for the terminal 10 to provide secure communications, and all three of these can be executed by the programmable DSP 104 of the terminal 10. The three basic functions are an encoder/decoder, an encrypter/decrypter, and a modem for transmitting and receiving the encrypted signals to and from the communications network to which the terminal 10 is coupled. The encoder/decoder digitizes and compresses the data down to a manageable data rate (e.g., 2400 bps up to 9600 bps), and it also includes a decoder function for the receive direction. The encrypter/decrypter encrypts the data stream coming from the encoder/decoder, and it also decrypts the received data stream. The DES encryption method can be used by the encrypter/decrypter. In general, a "key" is needed by the encrypter/decrypter to operate. The smartcard interface 136 can be used to allow a user of the terminal 10 to enter a key with a smartcard. In other embodiments, the key can be generated based on a random number.

Having described the hardware architecture and some of the functionality of the digital screen phone terminal 10 according to the invention, the operations performed by the programmable DSP 104 under software control will now be further described.

The digital screen phone terminal 10 has four modes of operation: off-line mode, on-line mode, facsimile mode, and phone mode. When in the off-line mode, the terminal 10 allows the user to perform application programs and built-in tools such as clock, alarms, calendar, organizer, calculator, phone list, etc. functions. It is the programmable DSP 104 alone that executes these programs and functions. For example, the programmable DSP 104 alone can perform the processing necessary to allow the user to interact with a home banking service, set/display a clock on the display screen 14, set/sound an alarm on the display screen 14 and/or the speaker in the housing 12 of the terminal 10, use a calculator on the display screen 14, and set a password on the display screen 14. In the on-line mode, the programmable DSP 104 alone simultaneously performs a variety of modem functions and terminal emulation which allow the user to communicate with and access various electronic services. When the terminal 10 is in the facsimile mode, the programmable DSP 104 alone performs a variety of facsimile modem functions including facsimile image send and receive functions. In the phone mode, the programmable DSP 104 alone performs a variety of telephone functions including speech path processing as well as other telephone functions such as auto-dialing, call progress monitoring, DTMF (dual-tone multi-frequency) processing, call status, call waiting status, call duration, caller information (e.g., caller ID and name), incoming/outgoing calling logs, dial from log, block selected calls, distinctive rings, and generally all of the telephone functions provided by a conventional feature telephone. In all four modes of operation, the programmable DSP 104 supports implementation of the graphical user interface. The single programmable DSP 104 thus alone performs a variety of tasks as well as supporting the graphical user interface, all under software control.

Figure 6:
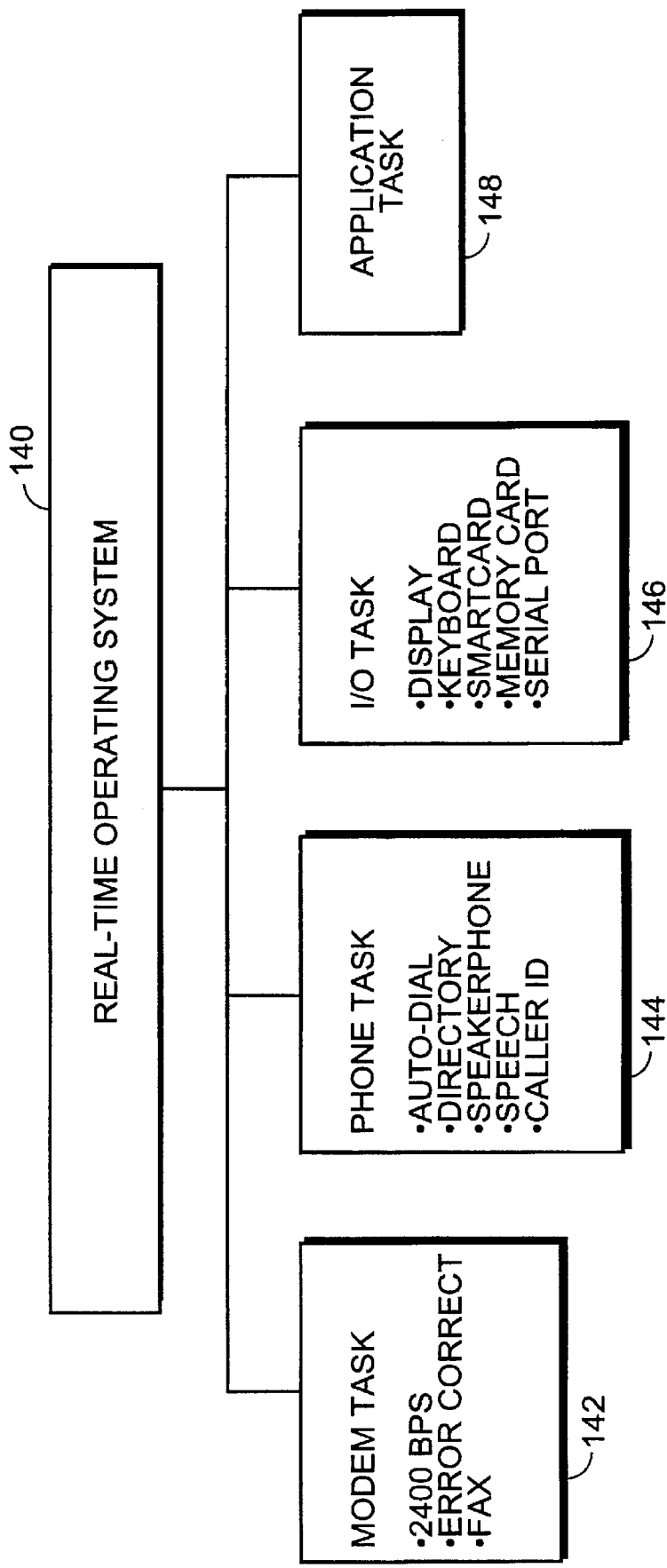
FIG. 6 is a diagram showing various tasks performed by the hardware of FIG. 5A or 5B.

Referring to FIG. 6, the various tasks performed by the programmable DSP 104 can be broken down into three task areas: a modem task 142 including data and facsimile handling, a phone task 144, and an application task 148. The I/O controller 106 which aids the programmable DSP 104 performs most or all of an I/O task 146. The modem task 142 corresponds to the on-line mode and the facsimile mode. The phone task 144 corresponds to the phone mode, and the application task 148 corresponds to the off-line mode and the on-line mode. In the on-line mode, both the modem task 142 and the application task 148 run concurrently. Concurrent with the particular task(s) being performed by the programmable DSP 104 (or the I/O controller 106), a real-time operating system (OS) is also executing on the programmable DSP 104. The real-time OS is always running in the background, and it requires a relatively small percentage of the DSP's compute power as compared to the DSP compute power required to perform any one of the three DSP-performed tasks 142, 144, 148. The real-time OS preferably is implemented in assembly language to minimize real-time demands, and it preferably is programmed into a protected part of the flash memory (120 in FIG. 5A and 126 in FIG. 5B) as an object module.

In the disclosed embodiment, the modem task 142 involves the programmable DSP 104 performing the function of a 2400 bps full-duplex data modem and a 9600 bps half-duplex fax modem including modulation/demodulation, compression/decompression, and error correction processing on the incoming and outgoing data signals. Other embodiments can implement higher speeds for both fax and data such as 14,400 bps. The phone task 144 involves the programmable DSP 104 performing speech path processing as well as implementing the features mentioned previously. The application task 148 involves the programmable DSP 104 executing the application programs mentioned previously. The I/O task 146 involves the I/O controller 106 performing, possibly with some help from the programmable DSP 104, the various external device interface low-level control support mentioned previously. The programmable DSP 104 accords the highest level of priority to the modem task 142 and the phone task 144 because these two tasks must operate on the incoming and outgoing voice/data signals in real-time to preserve the quality of the information. Lower priority is given to the I/O task 146 and the application task 148 because it generally is acceptable to, for example, slow the update rate of the display screen 14 or hold up an executing application program for a short period of time.

The real-time OS 140 running in the background on the programmable DSP 104 provides a means for application programs to gain access to the full functionality of the terminal 10 including the modem, telephone, built-in, display, and graphics functions. The programmable DSP 104 can perform a set of primitive graphical functions (PGFs). These PGFs are accessed by communicating with the programmable DSP 104 with a protocol that defines groups of command strings to implement each PGF. Each command string begins with a specified Graphics Command introducer (GCI) character which is an ASCII escape character. Following the GCI is a single character indicating the command to be performed as well as any parametric information needed by the programmable DSP 104 to process the request. Use of this protocol results in a low-resource, low-bandwidth communication method because the terminal 10 communicates using simple ASCII character strings. Because a wide range of PGFs can be represented by brief ASCII commands, the digital screen phone terminal 10 allows the user to interact with a high-level graphical user interface. Numerous graphical techniques and features found in high-end windowing environments are supported by the terminal 10 including buttons, scrolling lists, radio buttons, check boxes, dialog boxes, etc. (see, for example, FIGS. 3A–3C). The graphical user interface provided by the digital screen phone terminal 10 has the appearance of Motif, the windowing environment supported on high-end workstations. The graphical user interface provided by the terminal 10 is similar to Motif, Windows, and the Macintosh graphical user interfaces, but it requires far less memory to achieve: 32 kilobytes for the digital screen phone terminal versus 4+ megabytes for Motif, Windows, and Macintosh graphical user interfaces.

Referring to FIG. 7, an overview of some of the functionality of the digital screen phone terminal 10 according to the invention is provided. For POTS (Plain Old Telephone Service) functions 150, the terminal 10 provides pulse/tone capabilities. For Feature Phone functions 152, the terminal 10 provides a speakerphone 138, a mute button 78, a hold button 82, hands-free dialing, a redial button 84, lists (e.g., emergency, personal, and dial-from), and a message indicator lamp 32. For CLASS+ Features 154, the terminal 10 provides displaying caller information (e.g., caller ID and name), displaying incoming and outgoing calling log, dialing from log, block selected calls, and distinctive rings. For Personal Features 156, the terminal 10 provides set/display of a clock, set/sound an alarm, use a calculator, set password, and encrypt/decrypt lists, data sessions, facsimile, and voice messages. For Data Terminal functions 158, the terminal 10 provides auto dial, auto logon, auto answer, send/receive data (V.22 format or other format), error correction of data (V.42), compress/decompress data (V.42bis), and ADSI. For Facsimile functions 160, the terminal 10 provides incoming facsimile image processing (e.g., receive, store, display, and print) and outgoing facsimile processing (e.g., scanning, sending, and forwarding). For Answering Machine functions 162, the terminal 10 provides time/date stamping, selective replay, auto turn-on, digital outgoing/incoming (e.g., multiple messages, activate by code). The media 164 over which the digital screen phone terminal 10 can communicate include various communications networks including wireless communications networks and networks having analog transmission lines and/or digital transmission lines.

Variations, modifications, and other implementations of what is described herein will occur to those of ordinary skill in the art without departing from the spirit and the scope of the invention as claimed. Accordingly, the invention is to be defined not by the preceding illustrative description but instead by the following claims.

What is claimed is:

1. Apparatus for accessing electronic services, comprising:

a housing configured as a telephone and having a front portion;

a display device located on the front portion of the housing;

a telephone keypad located on the front portion of the housing and including keys pressable by a user of the apparatus;

means for providing the user with a graphical user interface including means for displaying user selectable options in a graphical format windowing environment on the display device and means for allowing the user to make selections from the options displayed in the graphical format windowing environment on the display device; and means, responsive to the user pressable keys and user selectable options, for providing modem functions and telephone functions and for executing application programs.

2. The apparatus of claim 1 wherein the means for providing modem and telephone functions and for executing application programs comprises a programmable digital signal processor.

3. A digital screen phone terminal, comprising:
- an input communications port into which incoming voice signals and incoming data signals are received;
- an output communications port from which outgoing voice signals and outgoing data signals are sent;
- a display device for displaying options in a graphical format windowing environment, the options being selectable by a user of the terminal and relating to at least some of the incoming and outgoing voice and data signals;
- a telephone keypad including keys pressable by the user to create at least some of the outgoing data signals;
- a telephone handset into which the user can speak to create the outgoing voice signals and with which the user can hear the incoming voice signals;
- an interface mechanism for allowing the user to make selections from the options displayed in the graphical format windowing environment on the display device;
- a programmable digital signal processor coupled to the input and output communications ports, the display device, the telephone keypad, the telephone handset, and the interface mechanism, the programmable digital signal processor processing the incoming and outgoing voice and data signals, providing modem functions and telephone functions, and generating the options displayed in the graphical format windowing environment on the display device; and
- a housing with the input and output communications ports, the display device, the telephone keypad, the interface mechanism, and the programmable digital signal processor, the housing having a front panel with the display device and the telephone keypad, the telephone handset being external to the housing.

4. The digital screen phone terminal of claim 3 wherein the modem functions provided by the programmable digital signal processor include modulation and demodulation, decompression and compression, and error correction of the outgoing and incoming voice and data signals.

5. The digital screen phone terminal of claim 4 wherein the incoming and outgoing data signals include representations of facsimile images.

6. The digital screen phone terminal of claim 3 wherein the telephone functions provided by the programmable digital signal processor include processing of the incoming and outgoing voice signals.

7. The digital screen phone terminal of claim 3 further comprising an alphanumeric keyboard coupled to the programmable digital signal processor.

8. The digital screen phone terminal of claim 3 wherein the input and output communications ports are coupled to a communications network from and to which the incoming and outgoing voice and data signals are received and sent.

9. The digital screen phone terminal of claim 8 wherein the input and output communications ports are coupled to the communications network which includes an analog transmission line.

10. The digital screen phone terminal of claim 8 wherein the input and output communications ports are coupled to the communications network which includes a digital transmission line.

11. The digital screen phone terminal of claim 3 wherein the input and output communications ports are coupled to a wireless communications network from and to which the incoming and outgoing voice and data signals are received and sent.

12. The digital screen phone terminal of claim 3 wherein the interface mechanism comprises a point-and-click mechanism which allows the user to select a desired one of the options displayed in the graphical format on the display device by moving a cursor to or near that option.

13. The digital screen phone terminal of claim 12 wherein the point-and-click mechanism includes a cursor controlling device and an activation button on the front panel of the housing, the cursor controlling device for moving the cursor to or near the desired one of the options and the activation button for selecting that option.

14. The digital screen phone terminal of claim 3 wherein the programmable digital signal processor performs encryption and decryption on the outgoing and incoming voice and data signals.

15. The digital screen phone terminal of claim 14 further comprising means, coupled to the programmable digital signal processor, for allowing a key to be entered, the key used in the encryption and decryption performed by the programmable digital signal processor.

16. Apparatus for accessing electronic services, comprising:
- a communications interface for receiving incoming voice signals and incoming data signals and for sending outgoing voice signals and outgoing data signals;
- a display device for displaying options which are selectable by a user of the apparatus and which relate to at least some of the incoming and outgoing voice and data signals;
- a telephone keypad including keys pressable by the user;
- a telephone handset for allowing the user to create the outgoing voice signals and hear the incoming voice signals;
- an interface mechanism for allowing the user to make selections from the options displayed on the display device;
- a programmable digital signal processor coupled to the communications interface, the display device, the telephone keypad, the telephone handset, and the interface mechanism, the programmable digital signal processor being responsive to the user selectable options and the user pressable keys and providing modem functions and telephone functions which operate on the incoming and outgoing voice and data signals, the programmable digital signals processor also generating the options displayed on the display device; and
- a housing with the communications interface, the display device, the telephone keypad, the interface mechanism, and the programmable digital signal processor, the housing having a front panel with the display device and the telephone keypad, the telephone handset being external to the housing.

17. The apparatus of claim 16 further comprising an alphanumeric keyboard coupled to the programmable digital signal processor.

18. The digital screen phone terminal of claim 16 wherein the interface mechanism comprises a point-and-click mechanism which allows the user to select a desired one of the options displayed on the display device by moving a cursor to or near that option, the point-and-click mechanism including a cursor controlling device and an activation button on the front panel of the housing, the cursor controlling device for moving the cursor to or near the desired one of the options and the activation button for selecting that option.

* * * * *